United States Patent
Colic et al.

(10) Patent No.: US 10,339,221 B2
(45) Date of Patent: Jul. 2, 2019

(54) AUTO-COMPLETION AND AUTO-CORRECTION OF CRYPTIC LANGUAGE COMMANDS WITH DYNAMIC LEARNING OF SYNTAX RULES

(71) Applicant: Amadeus S.A.S., Biot (FR)

(72) Inventors: Milos Colic, Nice (FR); Anthony Hock-Koon, Mougins (FR); Matthieu Belin, Antibes (FR); Leonardo Freitas Gomes, Antibes (FR); Hiwa Babahajiani, Golfe Juan (FR)

(73) Assignee: AMADEUS S.A.S., Biot (FR)

( * ) Notice: Subject to any disclaimer, the term of this patent is extended or adjusted under 35 U.S.C. 154(b) by 43 days.

(21) Appl. No.: 15/725,472

(22) Filed: Oct. 5, 2017

(65) Prior Publication Data

US 2019/0108216 A1 Apr. 11, 2019

(51) Int. Cl.
*G06F 17/00* (2019.01)
*G06F 17/27* (2006.01)
*G06N 20/00* (2019.01)

(52) U.S. Cl.
CPC .......... *G06F 17/278* (2013.01); *G06F 17/271* (2013.01); *G06F 17/2735* (2013.01); *G06N 20/00* (2019.01)

(58) Field of Classification Search
CPC .............................. G06F 17/271; G06F 17/00
See application file for complete search history.

(56) References Cited

U.S. PATENT DOCUMENTS

| | | | | |
|---|---|---|---|---|
| 5,764,873 A * | 6/1998 | Magid | ................... | G06F 3/0486 715/769 |
| 6,044,346 A * | 3/2000 | Ali | ........................ | G10L 15/285 704/231 |
| 8,935,192 B1 * | 1/2015 | Ventilla | ..................... | G06N 5/04 706/46 |
| 2004/0148170 A1 * | 7/2004 | Acero | ................. | G06F 17/2715 704/257 |
| 2011/0106895 A1 * | 5/2011 | Ventilla | .................. | G06Q 10/10 709/206 |
| 2012/0330982 A1 * | 12/2012 | Arnaud | ............. | G06F 17/30864 707/755 |
| 2013/0172806 A1 * | 7/2013 | Griessmann | .......... | A61M 1/282 604/28 |

* cited by examiner

*Primary Examiner* — Shreyans A Patel
(74) *Attorney, Agent, or Firm* — Thompson Hine LLP

(57) ABSTRACT

Systems, methods and computer program products for dynamic language learning and solving auto-correction and auto-completion tasks. By means of a computer, knowledge about the syntax of a Cryptic language is extracted from a training data set of Cryptic commands. This knowledge is stored in an n-gram tree forest. The information of the n-gram trees is then used to facilitate human computer interaction and return improved auto-completion and auto-correction suggestions.

20 Claims, 10 Drawing Sheets

Fig. 9

AUTO-COMPLETION AND AUTO-CORRECTION OF CRYPTIC LANGUAGE COMMANDS WITH DYNAMIC LEARNING OF SYNTAX RULES

TECHNICAL FIELD

The invention generally relates to methods, systems, and computer programs products for dynamic language learning and solving auto-correction and auto-completion tasks.

BACKGROUND

Many different programming languages exist for different purposes. In the industrial sector, companies or amalgamations of companies have developed their own languages for communication or transaction within their networks. The interfaces for communication in these networks are often strictly defined but the locally used languages may differ from company to company even if they have the same purpose. One example therefore is the travel industry. Large networks enable automated transactions between travel service providers and travel agencies. The travel industry networks are called Global Distribution Systems (GDS) and use their own languages for interaction between their users. These languages are commonly known as Cryptic languages, e.g., Galileo Cryptic, Amadeus Cryptic, and Sabre Cryptic. Although Cryptic languages are used for the same purpose, commands formulated in different Cryptic languages have different syntactic rules.

Characteristic for all Cryptic languages are their sentences, commonly known as Cryptic commands. As in any natural language, a sentence is formulated by combination of words, thus, every Cryptic command is formulated as combination of Cryptic words. Cryptic words are composed of Cryptic symbols, which basically are characters. Cryptic words are mainly formulated as abbreviations of natural language meaning descriptions. An example would be the Cryptic word an in Amadeus Cryptic, which stands for numerical availability, or nce, which stands for Nice (city in the south of France). One of the Cryptic languages' specifics is the lack of explicit word separators. Therefore, it is hardly determined, without prior extensive knowledge of the Cryptic language syntax, where one word stops and the other begins. However, this knowledge is required if the human-computer-interaction shall be facilitated by giving auto-correction and auto-completion suggestions.

The issues of non-apparent segmentation and of varying syntaxes of different Cryptic languages can be mitigated by statically declaring the rules for each possible command construction. Even though Cryptic languages have a finite number of possible constructions, this particular endeavor is time and computational resources consuming. The task of collecting and possibly translating these rules to a more suitable format is as difficult as declaring them from zero point.

Another possibility to tackle these issues is constructing a dynamic self-learning method which extracts the rules from users' data. The most notable reason for such a dynamic approach can be found in the desire for ability to learn rules of all Cryptic languages. Furthermore, if new rules are declared in the future, the system will still properly operate.

SUMMARY

According to a first aspect, a method for auto-completion and auto-correction of Cryptic language with dynamic learning of syntax rules is presented. A Cryptic language contains Cryptic commands, which are composed of unsegmented Cryptic words. The Cryptic words are composed of Cryptic symbols. The method comprises a pair of automatic processes, a general knowledge extraction process and a runtime auto-completion and auto-correction process.

The general knowledge extraction process learns the syntax of the Cryptic language. From a database, a temporally ordered collection of prior inputted Cryptic commands, so called training data set, is received. The general knowledge extraction process segments these Cryptic commands into Cryptic symbols and creates a symbol-level n-gram tree, which uses the information of the in Cryptic symbols segmented set of Cryptic commands. The symbol-level n-gram tree captures n-gram information between Cryptic symbols and is stored by the general knowledge extraction process.

The general knowledge extraction process determines positions of separators between Cryptic words within the Cryptic commands by applying a hierarchical majority voting, which uses the information from the symbol-level n-gram tree. The hierarchical majority voting comprises four stages. First, it arranges procedures for separating text into groups. Second, the text separation procedures determine positions for Cryptic word separators following their rules. Third, a first level voting among the text separation procedures within each group determines interim positions for Cryptic word separators. And fourth, a second level voting among the groups determines final positions for Cryptic word separators.

The general knowledge extraction process segments the Cryptic commands into Cryptic words based on the final positions determined by the hierarchical majority voting. With this information, a word-level n-gram tree and a word-bounded symbol-level n-gram tree are created. The word-level n-gram tree captures n-gram information between Cryptic words. The word-bounded symbol-level n-gram tree captures n-gram information between Cryptic symbols within Cryptic words. Both are stored for later use.

The general knowledge extraction process further extracts Cryptic command IDs from the Cryptic commands by using the information of the word-level n-gram tree. A Cryptic command ID is the first Cryptic word at the beginning of a Cryptic command. The general knowledge extraction process stores a modified training data set containing the temporally ordered Cryptic command IDs. With this information, a command-level n-gram which captures n-gram information between Cryptic command IDs created and stored.

The runtime auto-completion and auto-correction process receives, via a user interface, a runtime Cryptic command, which is either empty or composed of at least one Cryptic symbol. It generates auto-correction and auto-completion suggestions for the runtime Cryptic command, which is based on the extracted knowledge information about the Cryptic language stored in the symbol-level, word-bounded symbol-level, word-level, and command-level n-gram trees. Afterwards, the auto-correction and auto-completion suggestions for the runtime Cryptic command are returned via the user interface. Furthermore, the stored training data set of Cryptic commands is updated for the runtime Cryptic command being complete and correct by adding the runtime Cryptic command.

According to a second aspect, a computer system, being arranged to fulfil the features of the presented method, is provided.

According to a third aspect, a computer program product, stored on a non-transitory computer readable medium, is provided, wherein the program code, executed on a computer system, is arranged to carry out the features of the here presented method.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. Like reference signs refer to like elements throughout the following description of embodiments.

FIG. 9 shows exemplary score tables of the Needleman-Wunsch algorithm.

DETAILED DESCRIPTION

Figure 1:
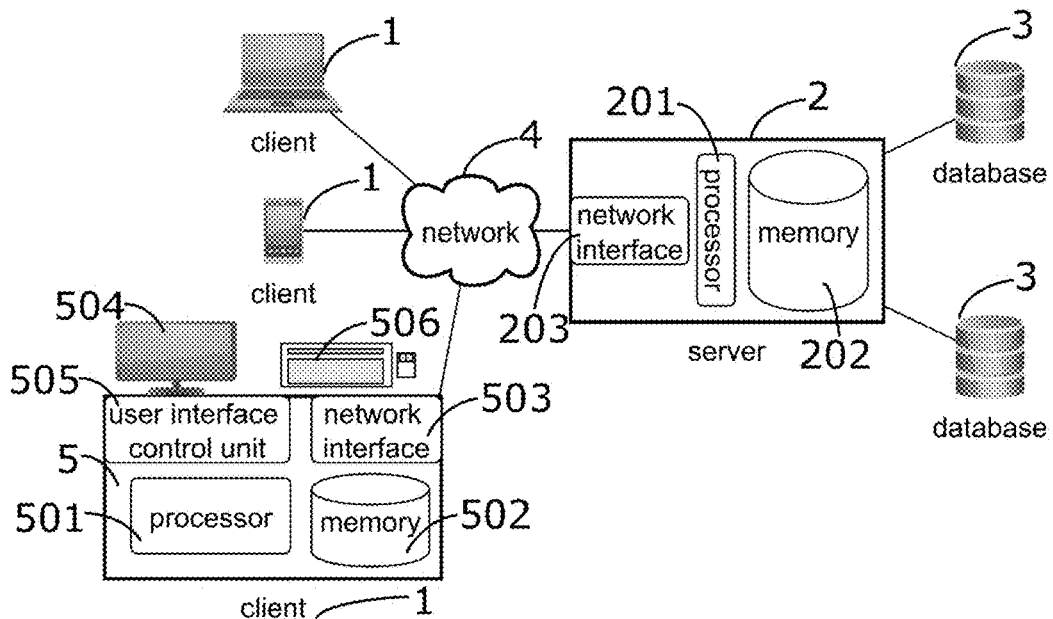
FIG. 1 depicts an exemplary operating environment.

FIG. 1 illustrates an exemplary operating environment. Before a detailed description of the figures is presented, some more general statements regarding optional embodiments are presented.

As already stated above, the present subject-matter relates to methods, systems, and computer programs for dynamic language learning and solving auto-correction and auto-completion tasks. It concerns a self-learning method which is able to extract knowledge about Cryptic languages out of users' data without prior syntax information and offer auto-correction and auto-completion suggestions to users. The technical aim of dynamically learning a language solely by user inputs and not by a predefined grammar, syntax and dictionary and returning to the user auto-correction and auto-completion suggestions based on this learned knowledge is generally to facilitate human computer interaction and improve the given suggestions.

In some embodiments, the generation of the auto-completion suggestions, for the runtime Cryptic command being empty, comprises searching for the most likely Cryptic command IDs in the command-level n-gram tree starting from the root and storing the most likely following Cryptic command IDs in a list of auto-completion suggestions.

In some embodiments, the runtime auto-completion and auto-correction process, for the runtime Cryptic command being complete and correct, extracts a runtime Cryptic command ID from the complete runtime Cryptic command by using the information of the stored word-level n-gram tree. The extracted runtime Cryptic command ID is added at the end of a runtime command-level list. The updated runtime command-level list is subsequently stored.

In some embodiments, the generation of the auto-completion suggestions, for the runtime Cryptic command being empty, comprises finding the most matching path in the stored command-level n-gram tree with the runtime command-level list and storing the most likely following Cryptic command IDs in a list of auto-completion suggestions.

In some embodiments, the generation of the auto-completion suggestions handles a runtime Cryptic command, which is not empty, thus, composed of at least one Cryptic symbol. At the beginning, it traverses the word-level n-gram tree starting from the root and proceeding with the following Cryptic words of the runtime Cryptic command until the last matching node. Afterwards, it searches for the most likely following Cryptic words of the last node in the word-level n-gram tree and stores the most likely following Cryptic words in the list of auto-completion suggestions. The generation of auto-completion suggestions further determines the suffix, which are the Cryptic symbols at the end of the runtime Cryptic command not matching a node in the word-level n-gram tree. If the suffix is not empty, it traverses the word-bounded symbol-level n-gram tree starting from the root and proceeding with the following Cryptic symbols of the suffix until the last matching node and from there further on to all leafs. Finally, it stores the most likely resulting paths, corresponding to Cryptic words, in the list of auto-completion suggestions.

In some embodiments, the generation of the auto-correction suggestions, for the runtime Cryptic command being composed of at least one Cryptic symbol, performs the Needleman-Wunsch algorithm on the runtime Cryptic command and on the paths in the stored word-level n-gram tree. After finding the Cryptic words or the Cryptic word sequences with the best matching score, these are stored as a list of auto-correction suggestions.

Some embodiments perform the Needleman-Wunsch algorithm incrementally. In a first example, the algorithm compares the runtime Cryptic command incrementally with each word of each path in the stored word-level n-gram tree. In a second example, the algorithm compares incrementally each new inputted Cryptic symbol of the runtime Cryptic command with a whole path of the stored word-level n-gram tree. In each of the two examples, the resulting score tables of previous comparisons are stored temporarily for computational performances.

In exemplary embodiments, some text separation procedures of the general knowledge extraction process are more precisely specified. Some of the text separation procedures are combinations of an entropy based segmentation procedure with either a weighted moving average procedure, an exponential moving average procedure, or a majority voting procedure. In some exemplary embodiments, text separation procedures are combinations of a mutual information based boundary-oriented segmentation procedure with either a weighted moving average procedure, an exponential moving average procedure, or a majority voting procedure.

In some embodiments, the first level and/or second level votings in the general knowledge extraction process are equal votings. In some embodiments, the Cryptic commands in the trainings data set are sole Cryptic commands of prior user sessions.

Returning now to the figures, FIG. 1 illustrates an exemplary operating environment. The environment includes one or more client devices 1, one server 2, and one or more databases 3. The client devices communicate with the server through one or more private or public networks 4, e.g., the Internet or local area network. The server 2 is connected with one or more databases 3. As explained in greater detail below, the databases 3 contain raw data and extracted knowledge.

Each client system 1, which may be a desktop computer, laptop computer, tablet computer, smart phone, or any other suitable computing device, is implemented on one or more computer devices or systems, such as the exemplary computer system 5. The computer system includes a processor 501, a memory 502 and a network interface 503. Furthermore, it may include a display 504, a user interface control unit 505 and/or an alpha-numeric and cursor input device 506.

The server includes a processor 201, a memory 202 and a network interface 203 to communicate with the clients 1. It is arranged to host the computer programs with a set of instructions to perform the method as described herein. An executable set of instructions (i.e., software) embodying any one, or all, of the methodologies described herein, resides completely, or at least partially, permanently in the memory of the server. When executed, corresponding process data resides in the memory and/or the processor of the server.

The server 2 is connected with one or more databases 3. The databases contain training data, such as a predefined set of Cryptic commands or prior inputted Cryptic commands. The databases 3 include extracted knowledge of the training data. This knowledge is organized in n-gram trees, which capture n-gram information about the Cryptic symbols, Cryptic words, and Cryptic command IDs in the training data.

In some embodiments, the training data and the extracted knowledge are stored in the memory 202 of the server or in each memory 502 of the client systems 1 not in separate databases 3. In some other embodiments, the client systems 1 fully or partially host the computer programs that are arranged to fulfil the features of the method as described herein. The server 2 additionally host computer programs that are arranged to fulfil the remaining method features.

Figure 2:
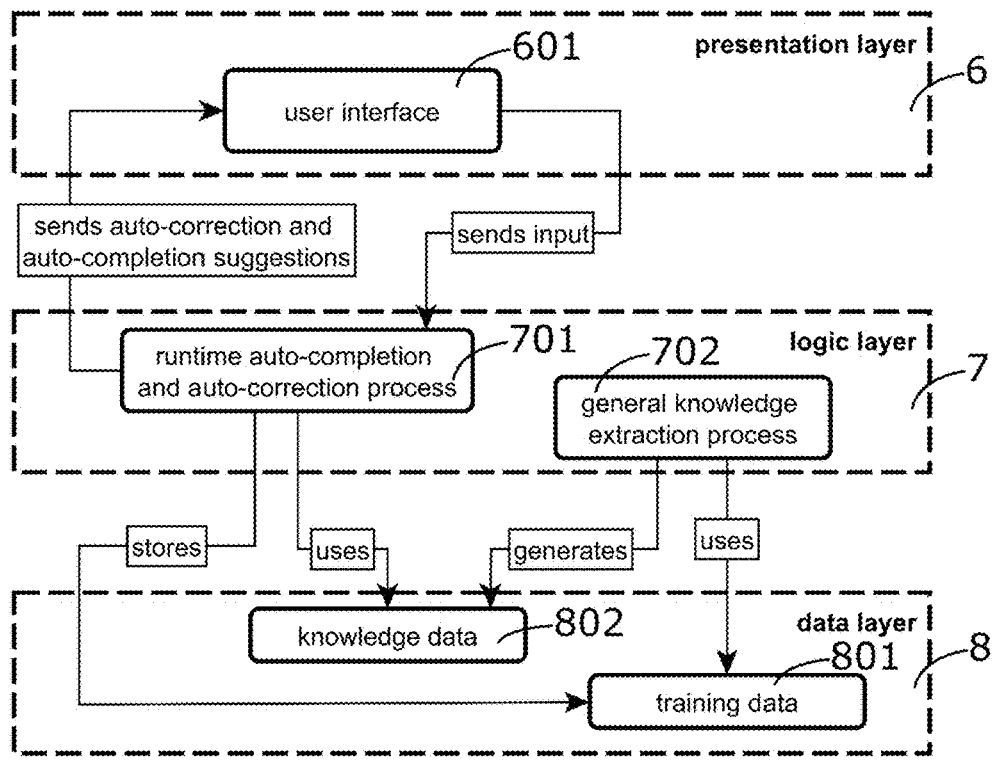
FIG. 2 shows a layer representation of an exemplary software architecture for the described method.

According to an exemplary software architecture, the software is, for example, programmed in three layers. In the abstract-level layer representation of FIG. 2, these three layers are: a presentation layer 6, a logic layer 7, and a data layer 8. This three layered architecture enables the particular parts of the method to be modular programmed at the clients and/or at the server. Thus, depending on critical factors, e.g., computational resources, network connection speed, current load of the network or memory capacity, parts of the software, programmed to fulfil the features of the method, may run on logically and/or geographically independent systems.

The presentation layer 6 contains the user interface 601, e.g., a commando line interface, a graphical user interface, or a voice user interface, which enables the human-computer interaction. The user interface 601 will usually be located at the client systems 1. Through the user interface, the input of the user is transferred to the logic layer 7. After the calculation of the auto-correction and auto-completion suggestions, these are transferred to the user through the user interface.

The logic layer 7 is the central part of the exemplary software architecture. This layer interacts with the two other layers and holds the logic of the method as described herein. It contains mainly two processes, the runtime auto-completion and auto-correction process 701 and the general knowledge extraction process 702. The runtime auto-completion and auto-correction process 701 receives the user input, uses the knowledge data stored in the data layer, and stores inputs as training data in the data layer. Furthermore, the auto-correction and auto-completion suggestions are herein computed and transferred to the user interface. The general knowledge extraction process 702 communicates only with the data layer 8 and uses the training data 801 and generates and stores the knowledge data 802.

The data layer 8 organizes the training data 801, which is raw data consisting of temporarily ordered Cryptic commands, and the knowledge data 801, which is extracted knowledge structured in n-gram trees.

Figure 3:
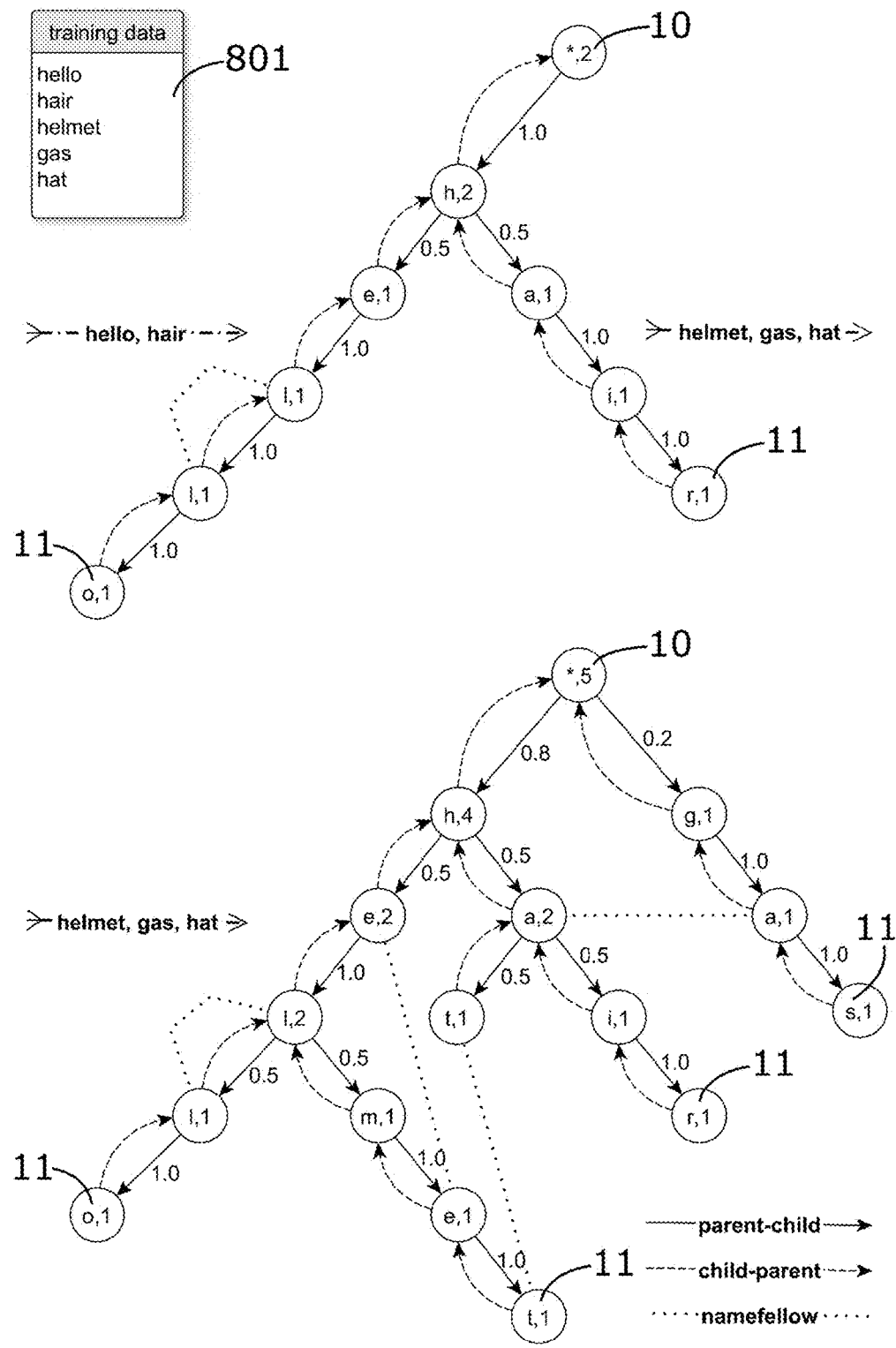
FIG. 3 depicts a flowchart of a general knowledge extraction process.

The knowledge, which is extracted by the general knowledge extraction process 702, is organized in n-gram trees. N-gram trees capture conditional probabilities among the entities they are considering, e.g., characters, words, or numbers as well as Cryptic symbols, Cryptic words or Cryptic commands. For illustration, FIG. 3 shows a training data set of five natural language words and the generation of the corresponding character-level n-gram tree.

An n-gram tree is composed of a root node 10 and several paths to the leaves 11. Each path reflects a sequence of entities. The number of occurrences of the entities at a specific position in a path is summed up and stored at each node for later use.

The value of an edge from a parent node with depth i−1 to a child node s with depth i of the n-gram tree may be calculated by the formula:

$$N_i^s(s_i \mid seq_{i-1}) = \frac{count(seq_{i-1} + s_i)}{count(seq_{i-1})},$$

with $s_i$ being the entity of the child node, $seq_{i-1}$ being the sequence of i−1 entities from the root to the parent node, and + being the concatenation of two sequences, entities or a sequence with an entity. The value of count(seqi−1) denotes the number of occurrences of $seq_{i-1}$ in the training data and can be directly found in the tree at the end node of the sequence. The calculation of the edge value corresponds to the conditional probability of observing $s_i$ after $seq_{i-1}$.

These conditional probabilities are also indicated in each of the exemplary n-gram trees of FIG. 3. For example, the probability of the first character can be directly determined from the tree: the probability of observing an "h" is 0.8 and observing a "g" is 0.2. Or another example is the sequence "h-e-l". If this is observed, the next character is with the same probability "l" or "m".

The general knowledge extraction process 702 generates three levels of n-gram trees: symbol-level n-gram tree and word-bounded symbol-level n-gram tree, word-level n-gram tree, and command-level n-gram tree. Each individual tree data structure captures different granularities of n-gram information. The symbol-level n-gram tree captures n-gram information between Cryptic symbols, the word-level n-gram tree between Cryptic words, and the command-level n-gram tree between Cryptic commands.

Figure 4:
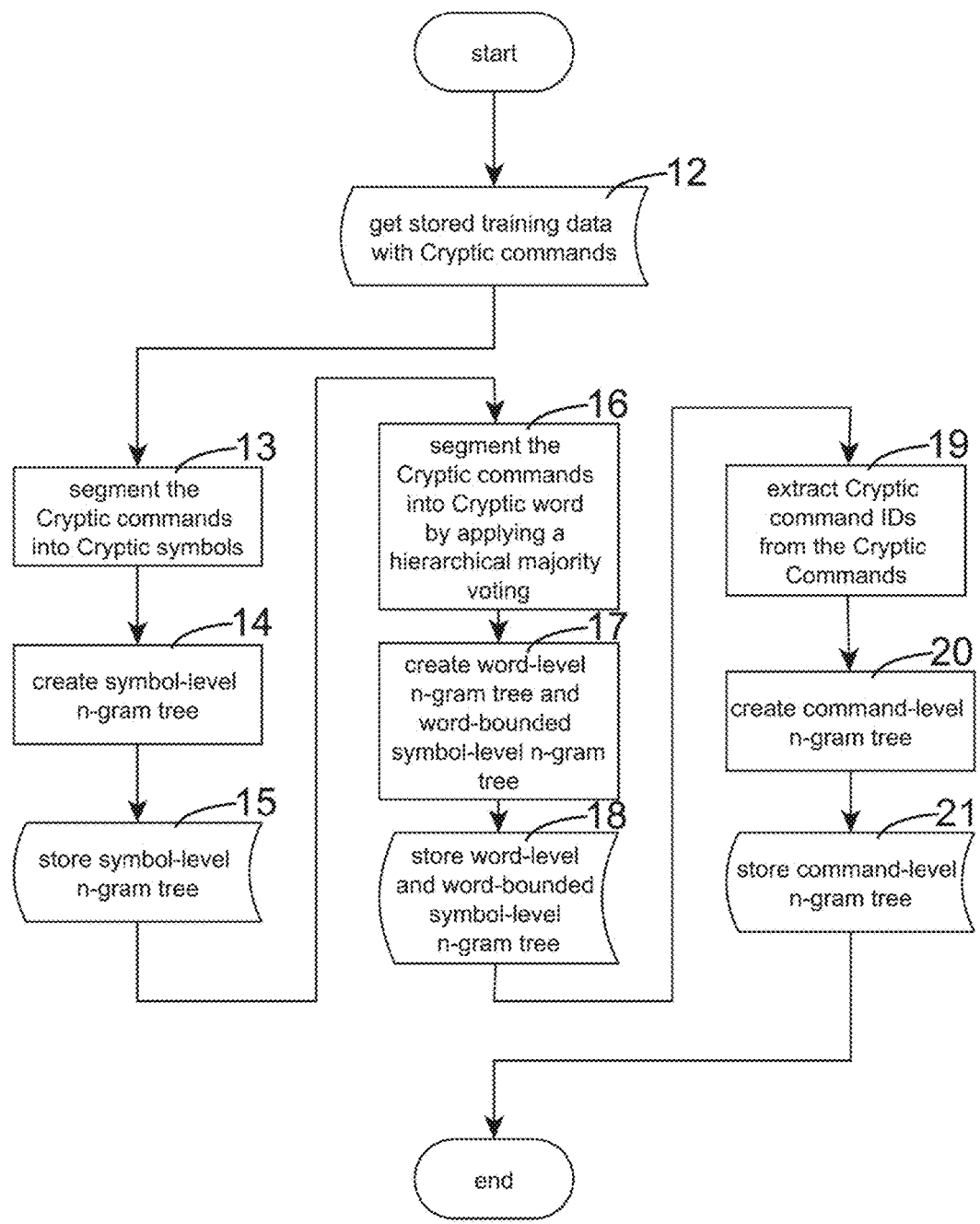
FIG. 4 demonstrates a knowledge organization with an n-gram tree.

FIG. 4 shows a flowchart of the basic version of the general knowledge extraction process 702. In a first block 12, the process retrieves the training data 801 from the database or from a local memory. This training data 801 consists of temporarily ordered Cryptic commands. A Cryptic command is an ordered collection of Cryptic words. One cryptic word is more important than others are: the Cryptic command ID. This word is the operation information carrier and the first word of the command. Cryptic words are usually formulated as abbreviations of natural language meaning descriptions; example would be an in Amadeus Cryptic, which stands for Numerical Availability, or nce, which stands for Nice (city in the south of France). Cryptic words are composed of Cryptic symbols. Examples of such Cryptic commands are an15junparnce, an15junparbeg, and dneat7. In one embodiment, Cryptic symbols refer to individual ASCII symbols but this is not strictly defined. In other embodiments, Cryptic symbols can also refer to more than one ASCII character, e.g., the number 17, which is composed of two characters, may be considered as one Cryptic symbol.

With the training data 801, the process starts to extract knowledge in three levels. The first level is the symbol-level knowledge. The Cryptic commands of the training data are segmented into Cryptic symbols in block 13. Therefore, any parser that splits a sequence of entities into its single entities can be used, e.g., regex parser or string parser. Each Cryptic command is considered separately. In block 14, the symbol-level n-gram tree is created analogous to the description of FIG. 3. The Cryptic symbols of each Cryptic command are defining a path in the symbol-level n-gram tree. After all Cryptic commands of the training data are incorporated into the symbol-level tree, the corresponding probabilities are calculated as stated above. The final symbol-level n-gram tree is then stored in a database or another memory in block 15.

The second level is the word-level knowledge. The Cryptic commands of the training data are segmented into Cryptic words in block 16. Therefore, the information from the prior generated symbol-level n-gram tree is required. Several text segmentation procedures use this information. They are combined in a hierarchical voting method which is described in detail below on the example of FIG. 5. When the final word separation positions are determined, the Cryptic words of the Cryptic commands are incorporated in a word-level n-gram tree. Furthermore, a variant of the symbol-level n-gram tree is generated in which the symbol-level n-gram information is regarded bounded to the Cryptic words not to the Cryptic commands, i.e., each path from the root to the leaves illustrates a Cryptic word. This tree is consequently called word-bounded symbol-level n-gram tree. The same logic, analogous to the description of FIG. 3, applies to these two new n-gram trees as well. After generation of the final word-level n-gram tree and the word-bounded symbol-level n-gram tree in block 17, these are stored in the memory in block 18.

The third level is the command-level knowledge. This requires to extract the Cryptic command IDs from the Cryptic commands in block 19. Therefore, based on the word-level knowledge, the first word of each Cryptic command is extracted. Due to the fact that the training data is temporarily ordered, there exist relations among the Cryptic commands in time such as the position of the Cryptic symbols in the Cryptic commands. This allows again the creation of the command-level n-gram tree analogous to the description of FIG. 3 which is done in block 20. The command-level n-gram tree is finally stored in the memory in block 21.

Figure 5:
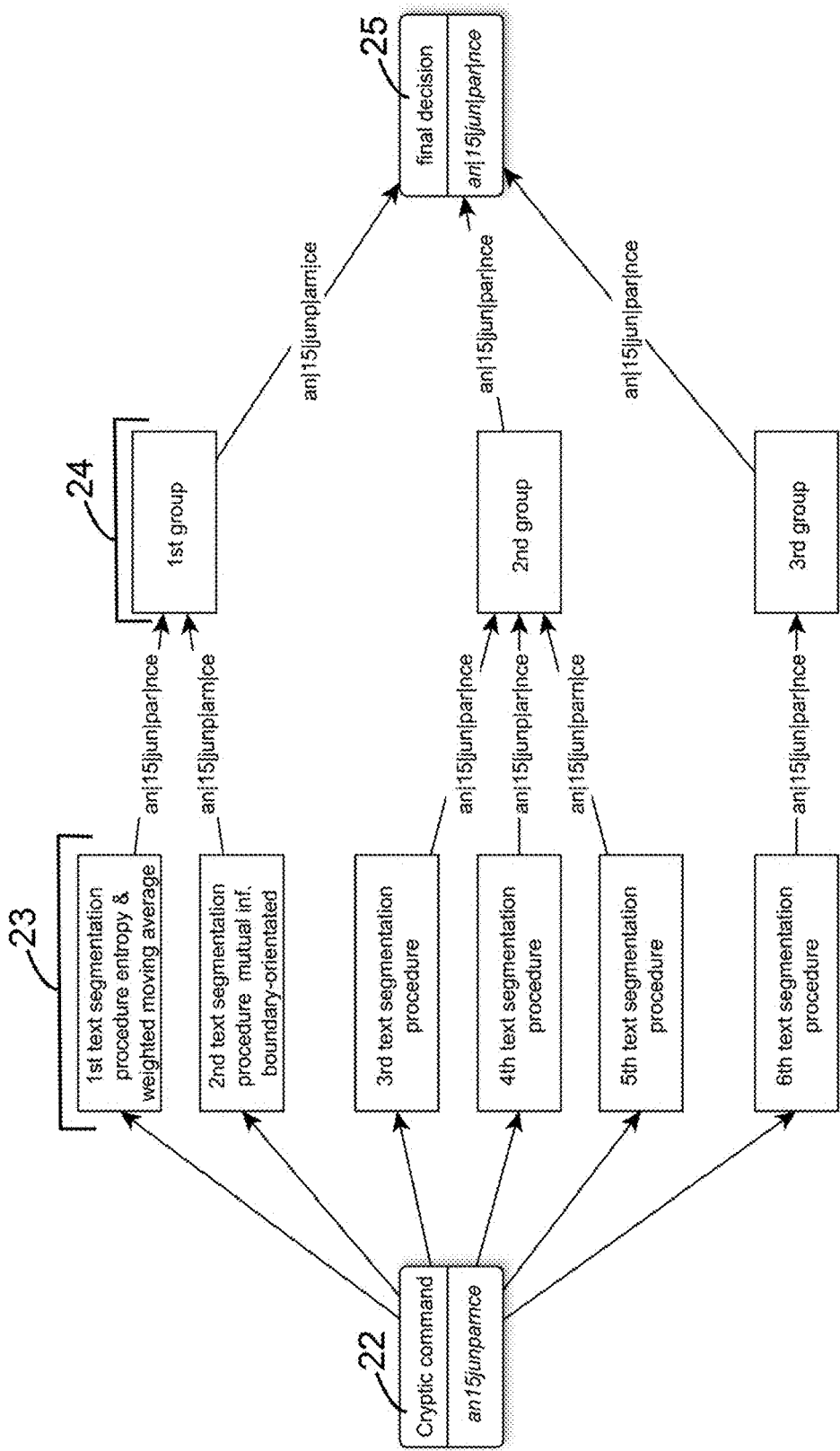
FIG. 5 shows an example of separating a Cryptic command in Cryptic words with the hierarchical majority voting.

To determine the word separators and to generate the word-level knowledge, a hierarchical majority voting for determining the positions of the Cryptic word separators in a Cryptic command 22 is constructed. In the example of FIG. 5, six text segmentation procedures 23 are used and grouped into three groups 24.

A text segmentation procedure 23 in this context is any procedure that determines positions for splitting sequences into parts. In some embodiments, these procedures are entropy based segmentation procedures, mutual information based boundary-oriented segmentation procedures and/or combinations of these with weighted moving average procedures, exponential moving average procedures, or majority voting procedures. Some or all of the text segmentation procedures may follow the same rules, others may be totally different.

Regarding the example of FIG. 5: The Cryptic command 22 is an15junparnce, which shall be segmented into Cryptic words. The 1st text segmentation procedure is an entropy based segmentation procedure combined with weighted moving average procedure and the 2nd text segmentation procedure a mutual information based boundary-oriented segmentation procedure. The other four segmentation procedures are any text segmentation procedures.

The exemplary entropy based segmentation procedure uses the information from the symbol-level n-gram tree, with X being the alphabet of the training data, to determine the entropy $$H(X|seq_{i-1}) = -\Sigma_{s_{i^*} \in X} N_{i^*}{}^s(s_{i^*}|seq_{i-1}) \log(N_{i^*}{}^s(s_{i^*}|seq_{i-1})).$$

The entropy value corresponds to probability distributions of possible successors' of a particular Cryptic symbol sequence $seq_{i-1}$. If the probabilities for potential $i^{th}$ character are scattered among many possibilities $s_{i^*}$, with almost equally balanced probabilities, the observed entropy value will be large. If there is, on the other hand, a high n-gram probability for one successor, the entropy value is low. Thus, the entropy value explodes if the next Cryptic symbol is unclear which happens most often on the end of a Cryptic word. Whenever the entropy value increases, the segmentation procedure will imply existence of a word separator on the position where entropy increases.

The weighted moving average procedure is generally an averaging function that is defined on top of a sliding and/or extending window. For combination with an entropy based segmentation procedure, the window is only extended to the prior Cryptic symbols because only these are relevant for calculating the entropy.

The exemplary mutual information based boundary-oriented segmentation procedure uses the mutual information of the symbol-level n-gram tree, which is defined as:

$$mi(seq_A | seq_B) = \log\left(\frac{\frac{freq(seq_A + seq_B)}{Y}}{\frac{freq(seq_A)}{Y} \frac{freq(seq_B)}{Y}}\right),$$

with $seq_A$, $seq_B$ being sequences of entities and + being the concatenation of two sequences. The value of $freq(seq_A)$ denotes the number of occurrences of $seq_A$ and Y the total number of entities in the training data. These values can be extracted from the n-gram trees. The mutual information value is the higher, the more likely the sequence B follows on the sequence A. To further improve the guess for a word boundary, four different mutual information values of a slighting window around the considered word boundary are considered. By taking the minimum of these, this leads to the final formula of the mutual information based boundary-oriented segmentation procedure:

$$B(s_{i-2}+s_{i-1} \mid s_i+s_{i+1}) = \min \begin{Bmatrix} mi(s_{i-1} \mid s_i), \\ mi(s_{i-1} \mid s_i+s_{i+1}), \\ mi(s_{i-2}+s_{i-1} \mid s_i), \\ mi(s_{i-2}+s_{i-1} \mid s_i+s_{i+1}) \end{Bmatrix}.$$

A decision for a word boundary may then be reached if the value of this formula is lower than a threshold.

Now returning to the segmentation of the Cryptic command an15junparnce. The $1^{st}$, $3^{rd}$ and $6^{th}$ text segmentation procedures come to the segmentation an|15|jun|par|nce, the $2^{nd}$ to an|15|junp|arn|ce, the $4^{th}$ to an|15|junp|ar|nce, and the $5^{th}$ to an|15|jun|parn|ce. As the text segmentation procedures are grouped into three groups in this example, there are three first level votings among the text separation procedures within each group in the next stage. In some embodiments, these votings are equal votings. Other voting procedures are possible, such as weighted voting or dictatorial voting.

For the example of FIG. 5, an equal voting is used which can be best seen on group 2. There are 3:0 votes for a separation between an and 15..., 3:0 for a separation between ...15 and jun..., 2:1 for a separation between ...jun and par..., and 2:1 for a separation between ...par and nce. Thus, the group's decision is the segmentation an|15|jun|par|nce that goes into a second level voting among the groups.

The second level voting procedure may be from different nature, such as equal voting, weighted voting, or dictatorial voting. In the present example, an equal voting leads to the final decision 25 of the hierarchical majority voting: an|15|jun|par|nce. Thus, with the help of this voting method, the general knowledge extraction segments the Cryptic commands into Cryptic words, here the words an, 15, jun, par, and nce, and generates the word-level n-gram tree and the word-bounded symbol-level n-gram tree (see FIG. 4).

Figure 6:
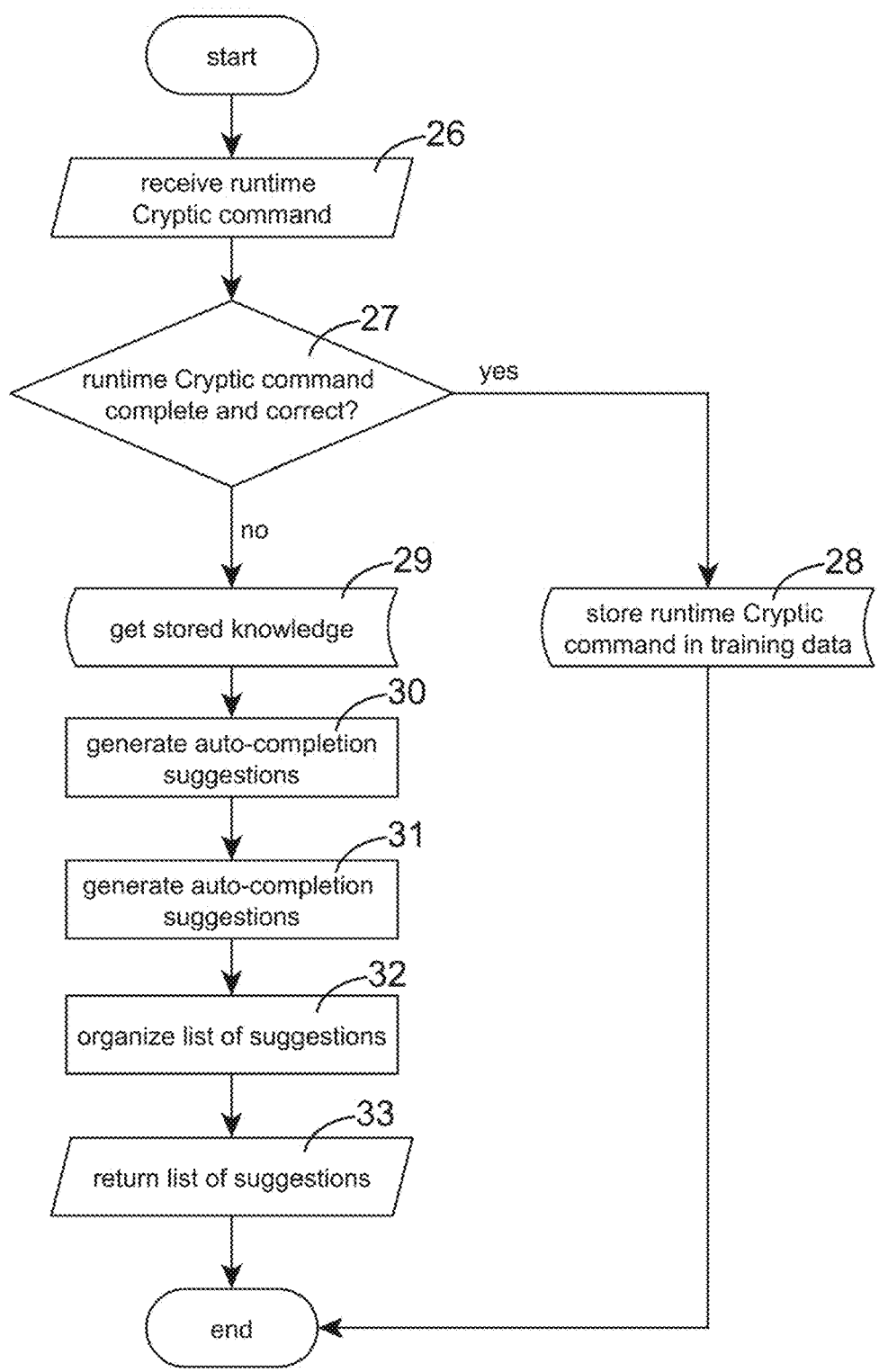
FIG. 6 presents a flowchart of the runtime auto-completion and auto-correction process.

FIG. 6 shows a flowchart of basic runtime auto-completion and auto-correction process 701. A runtime Cryptic command, that is, the current input of the user, is received from the user interface in block 26. In the next block 27, the process splits into two branches. If the user input is a complete and correct Cryptic command, auto-completion and auto-correction suggestions are not required but the Cryptic command is saved in the training data, shown in block 28. This enables a dynamic learning of syntax rules. The next time, the general knowledge extraction process is started the training data contains more information thereby. In some embodiments, this branch of the runtime auto-completion and auto-correction process 701 also saves a temporarily ordered runtime command-level list that contains the extracted Cryptic command IDs from the runtime Cryptic commands previously inputted in the current user session.

In all other cases, i.e., the runtime Cryptic command is empty or consists of at least one Cryptic symbol, the runtime auto-completion and auto-correction process generates a list of auto-completion and auto-correction suggestions for the user in block 29. A pair of separate processes are designed: an auto-completion generation 30 and an auto-correction generation 31 that both return a list of suggestions. In block 32, these two lists are then organized in a final list of suggestions for the user. In some embodiments, the lists of suggestions are without any order or ordered, e.g., by the probability of the suggestion or auto-correction suggestions first and auto-completion suggestions second. Furthermore, the final list may be truncated to a fixed number of words in total and/or to a fixed number of words with respect to the suggestion category. Some suggestions may occur in both categories, e.g., missing Cryptic symbols at the end of a runtime Cryptic command lead to an auto-correction and auto-completion suggestion. In these cases, one occurrence is deleted. At the end in block 33, the list of suggestions is returned to the user.

Figure 7:
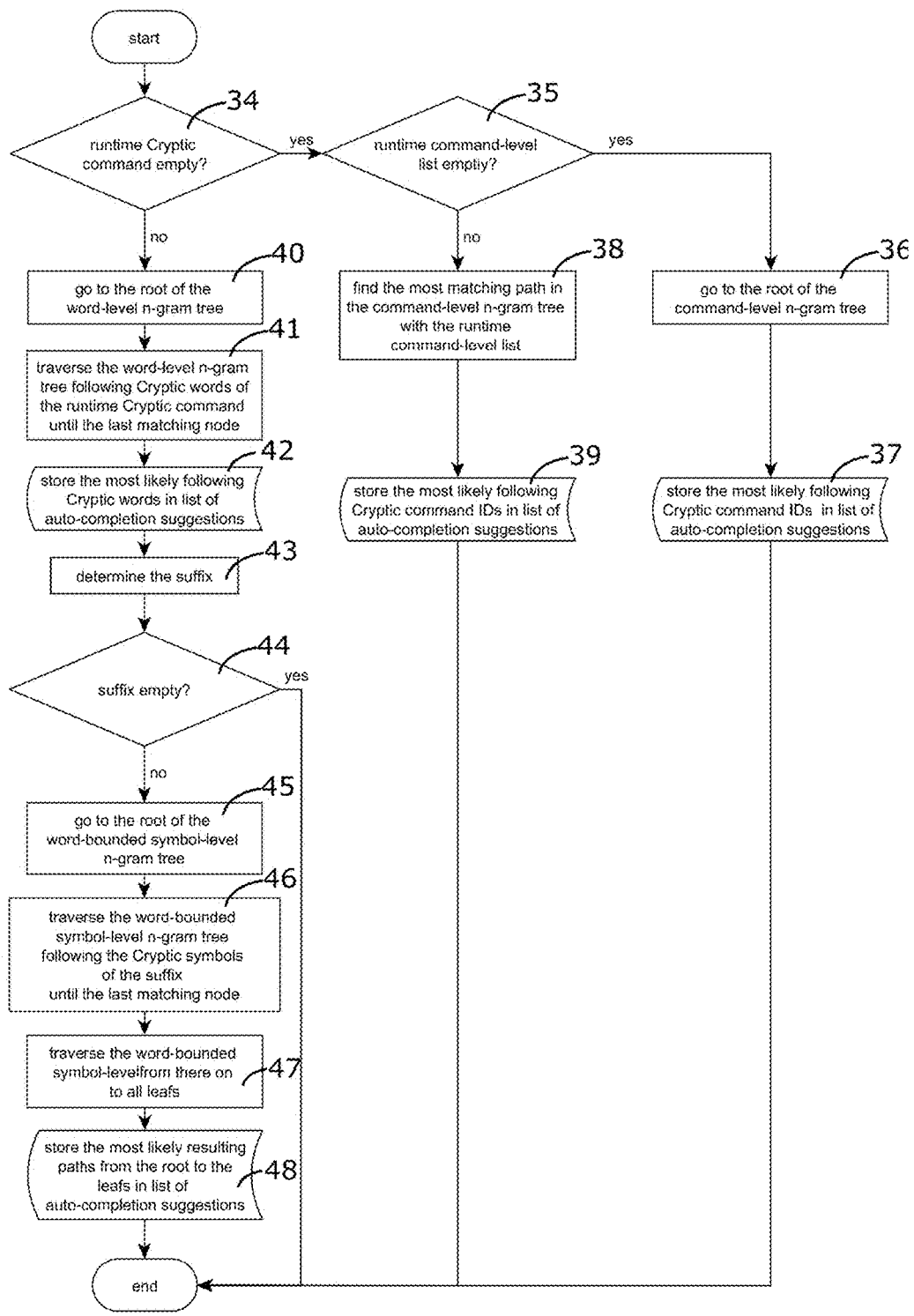
FIG. 7 visualizes an example procedure of generating auto-completion suggestions.

An embodiment of the generation of auto-completion suggestions 30 is depicted in FIG. 7. At blocks 34 and 35, the runtime Cryptic command is analyzed. If the runtime Cryptic command is empty, i.e., the user only shows the intention to input a Cryptic command but has nothing inputted yet, and if the runtime command-level list is empty as well, e.g., this is the first input of the user in the current user session, block 26 leads to the root of the command-level tree (block 36). The Cryptic commands with the highest probability on the edge from the root of the command-level n-gram tree are selected. These are then stored as auto-completion suggestions in block 37.

If the runtime Cryptic command is empty but the runtime command-level lists contains entries, block 38 is performed. The entries of the list are compared with the entries in the command-level n-gram tree and the most matching path is selected. In block 39, the Cryptic commands that follow most likely on this matching path are stored as auto-completion suggestions.

If the runtime Cryptic command is composed of at least one Cryptic symbol, the process goes to block 40 and starts from the root of the word-level n-gram tree. This tree is traversed from the root until the last matching Cryptic word in block 41. The most likely following Cryptic words are then stored into the list of auto-completion suggestions in block 42. In block 43, the suffix, which contains the remaining Cryptic symbols at the end of the runtime Cryptic command that do not match any complete Cryptic word, is determined. In block 44, this suffix is analyzed. If the suffix is empty, i.e., all Cryptic symbols of the runtime Cryptic commands can be matched to Cryptic words in the word-level n-gram tree, the process ends. If not, block 45 leads to the root of the word-bounded symbol-level n-gram tree which is in block 46 traversed from the root following the Cryptic symbols of the suffix to the last matching node. In block 47, the most likely paths from the last matching node to each reachable leaf are determined. In block 48, these are stored in the list of auto-completion suggestions.

For example, if the runtime Cryptic command is an15jun, the word-level n-gram tree is traversed from root over an and 15 to jun. The Cryptic words with the highest probability to follow on the node jun may be par (for Paris), muc (for Munich), and lon (for London). These would be stored in the suggestions list and returned. If, in another case, the runtime Cryptic command is an15junp, the same activities as described above are performed but, moreover, the suffix p causes the method to search the word-bounded symbol-level n-gram tree for more auto-completion suggestions. The most likely Cryptic words starting with p may be par (for Paris), pek (for Peking), pmi (for Palma de Mallorca) and per (for Perth in Australia). Thus, these words will also be included into the list of auto-completion suggestions and returned.

Figure 8:
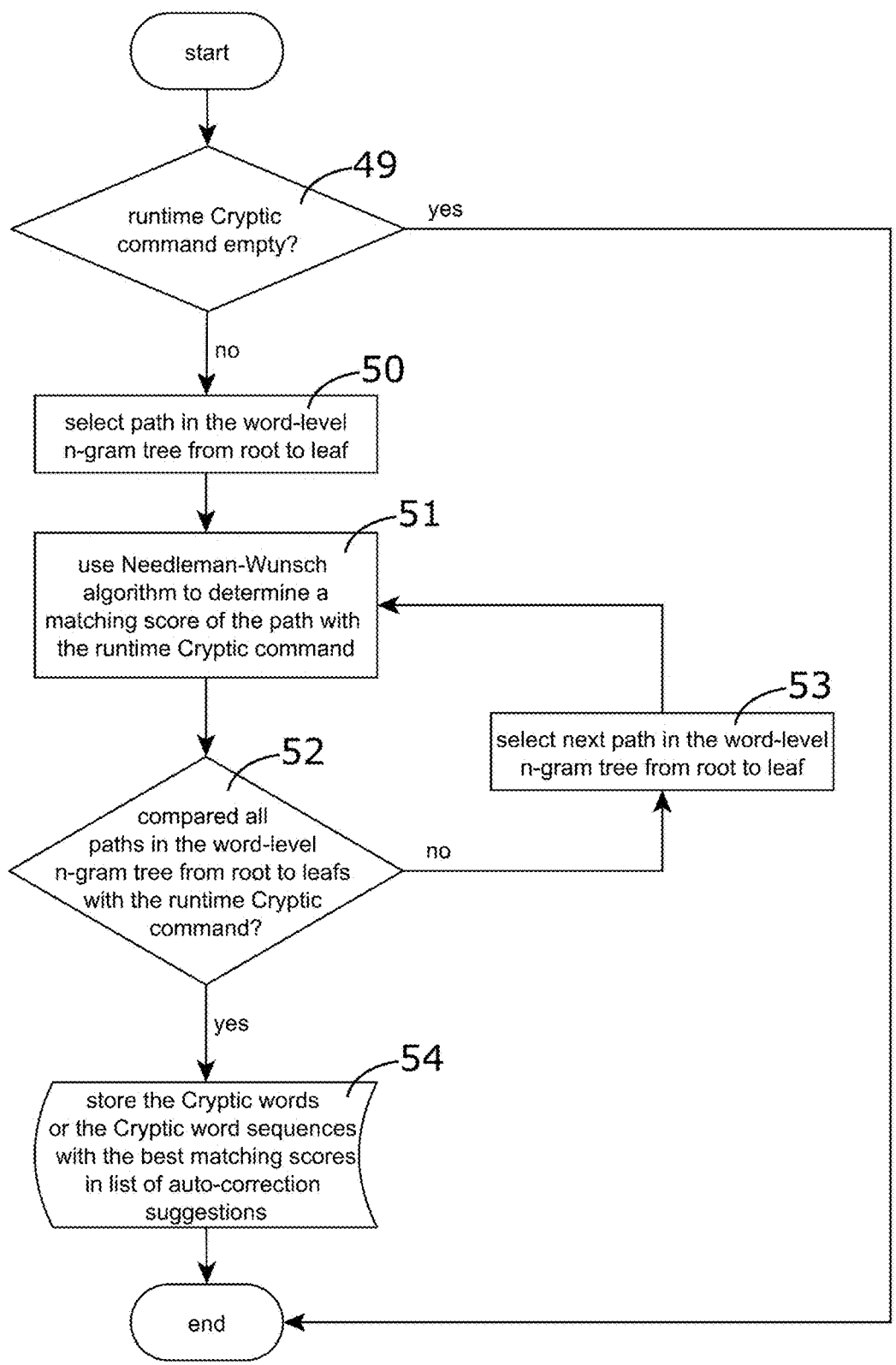
FIG. 8 shows the basic procedure of generating auto-correction suggestions.

FIG. 8 shows a flowchart for an embodiment of the generation of auto-correction suggestions 31. In block 49, the Cryptic command is analyzed. If the runtime Cryptic command is empty, there is no need to give auto-correction suggestions. Thus, only if there are inputted Cryptic symbols, auto-correction suggestions are generated. For this purpose, all paths in the word-level n-gram tree are compared with the runtime Cryptic command. The best matching words or sequences of words (paths) are stored in the list of auto-correction suggestions.

In block 50, a path from the root to a leaf in the word-level n-gram tree is selected. In this embodiment, the Needleman-Wunsch algorithm is used for the comparison of the runtime Cryptic command and the word-level n-gram tree. Block 51 contains the necessary actions of the Needleman-Wunsch algorithm which are described below. This is done for all paths in the word-level n-gram tree which is depicted by the blocks 52 and 53. At the end in block 54, the best matching word sequences are stored in the list of auto-corrections.

Figure 9:
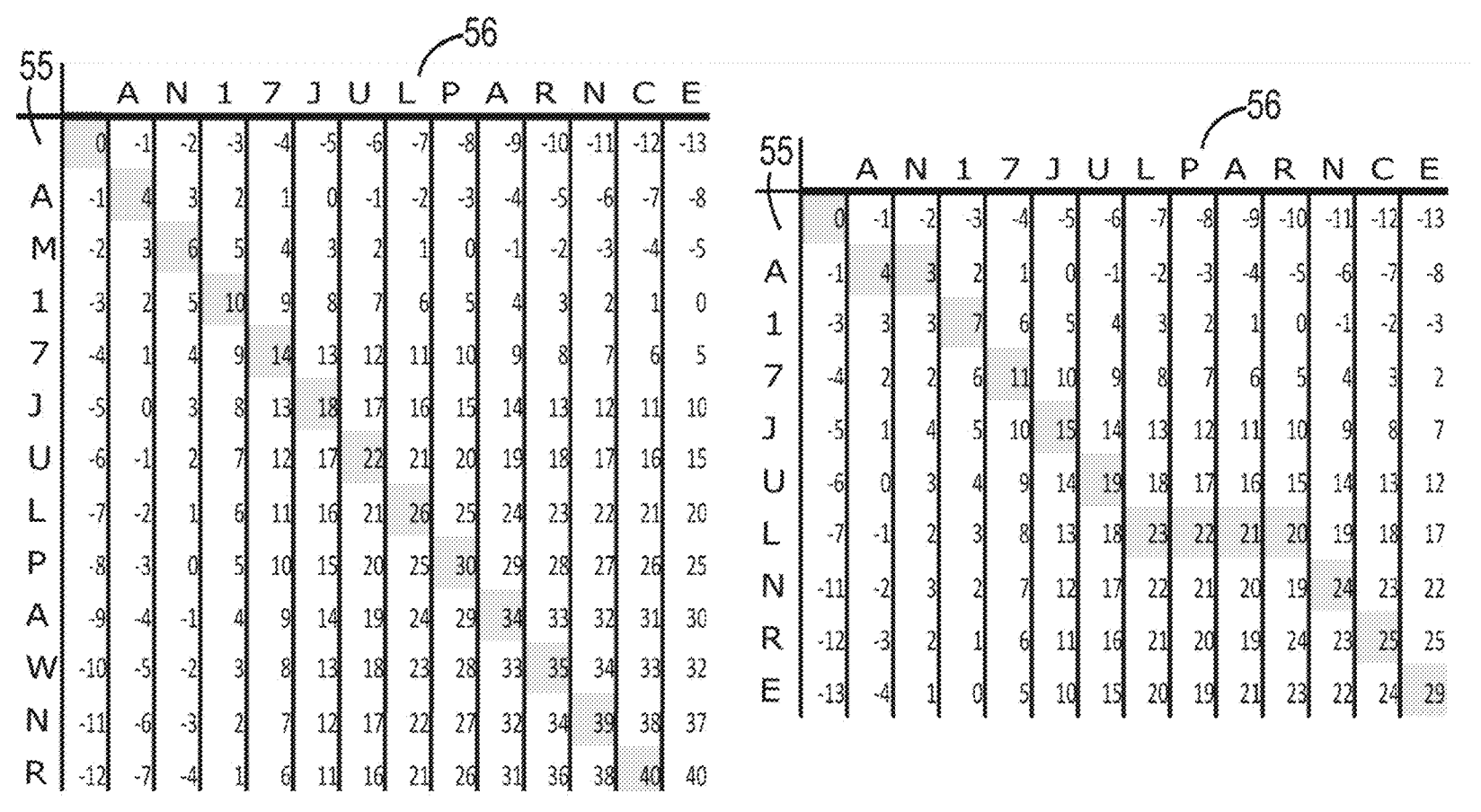

The Needleman-Wunsch algorithm determines a score table with matching scores of the two Cryptic commands. The table is based on a vertical string 55, the Cryptic command of the path in the word-level n-gram tree, and a horizontal string 56, the runtime Cryptic command. A visualization of this table is show in FIG. 9. The first column and the first row are prefilled with values that correspond to complete mismatches, i.e., starting from 0 in the upper left corner and every mismatch leads to minus 1. The table is computed from top left to bottom right using a simple but very effective principle by only considering three neighbors of $c[i,j]$. These neighbors are the diagonal upper left neighbor $c[i-1,j-1]$, the upper neighbor $c[i-1,j]$, and left neighbor $c[i,j-1]$. More precisely, there are three possible moves:

Diagonal from $c[i-1,j-1]$ to $c[i,j]$: $c[i,j]=c[i-1,j-1]+r$
Down from $c[i-1,j]$ to $c[i,j]$: $c[i,j]=c[i-1,j]+d$
Right from $c[i,j-1]$ to $c[i,j]$: $c[i,j]=c[i, j-1]+d$ The diagonal move corresponds to a match between the Cryptic symbols $s_i$ and $s_j$. Basic values for the reward r and the penalty dare, for example, $r=1$ if $s_i=s_j$, $r=-1$ if $s_i \neq s_j$, and $d=-1$. Move down represents an introduction of a symbol placeholder in the horizontal string. This move includes a penalty for not being able to match a symbol in the vertical string. A pointer is stored in the table that indicates which move led to the value of a cell. Once the full table is computed, the way how the table was computed can be reproduced from the lower right corner. This way indicates how the words differ, i.e., if they are equal except for one, two or more symbols and where the differences are. At the lower right corner, a final matching score can be further found which may be used to determine the best matching sequences to store in the list of auto-correction suggestions.

In some embodiments, a reward matrix is used to determine $r$=reward $[s_i, s_j]$. In this case, a match should be understood in a broader sense. A match indicates that the reward we get from the reward matrix is larger than the penalty d. A penalty smaller than the penalty d is also considered as a logical reward. The reward matrix is filled with the following values inspired by the character displacement on a physical keyboard:

Cryptic symbols are matched: reward is A
Cryptic symbols are close neighbors: reward is C
Cryptic symbols are far neighbors: reward is F
Cryptic symbols are mismatched: reward is M This reward matrix is initialized as a symmetric matrix, meaning that reward $[s_i, s_j]$=reward $[s_j, s_i]$. Matches are Cryptic symbols that are simply the same. Close neighbors are Cryptic symbols with characters physically adjacent on a keyboard. Far neighbors are Cryptic symbols with their corresponding characters being one key further away than the close neighbors. Lastly, mismatched Cryptic symbols are all the other characters on the keyboard. Therefore, a good choice is A>C>F>M, with M being negative with the value of the penalty d. Exemplary values are A=5, C=3, F=1 and M=−1.

In an example, the reward matrix also has the ability to learn logical proximity of inputted characters during the runtime. Every time, a particular typing error is recognized, the reward is increased. In order to avoid unbounded growth of reward for some characters, a smoothing approach is applied in the learning strategy. Thus, two characters, having been initialized as a mismatch at the beginning, can converge to a match if the user is switching these characters often enough. It is worth noticing that symmetry of the matrix will disappear during the run time. This is a desired behavior since due to unsymmetrical shape of human hands there is an intrinsic empirical bias toward one direction of errors. It is more probable to make an error by using the thumb than by using the index finger.

Figure 10:
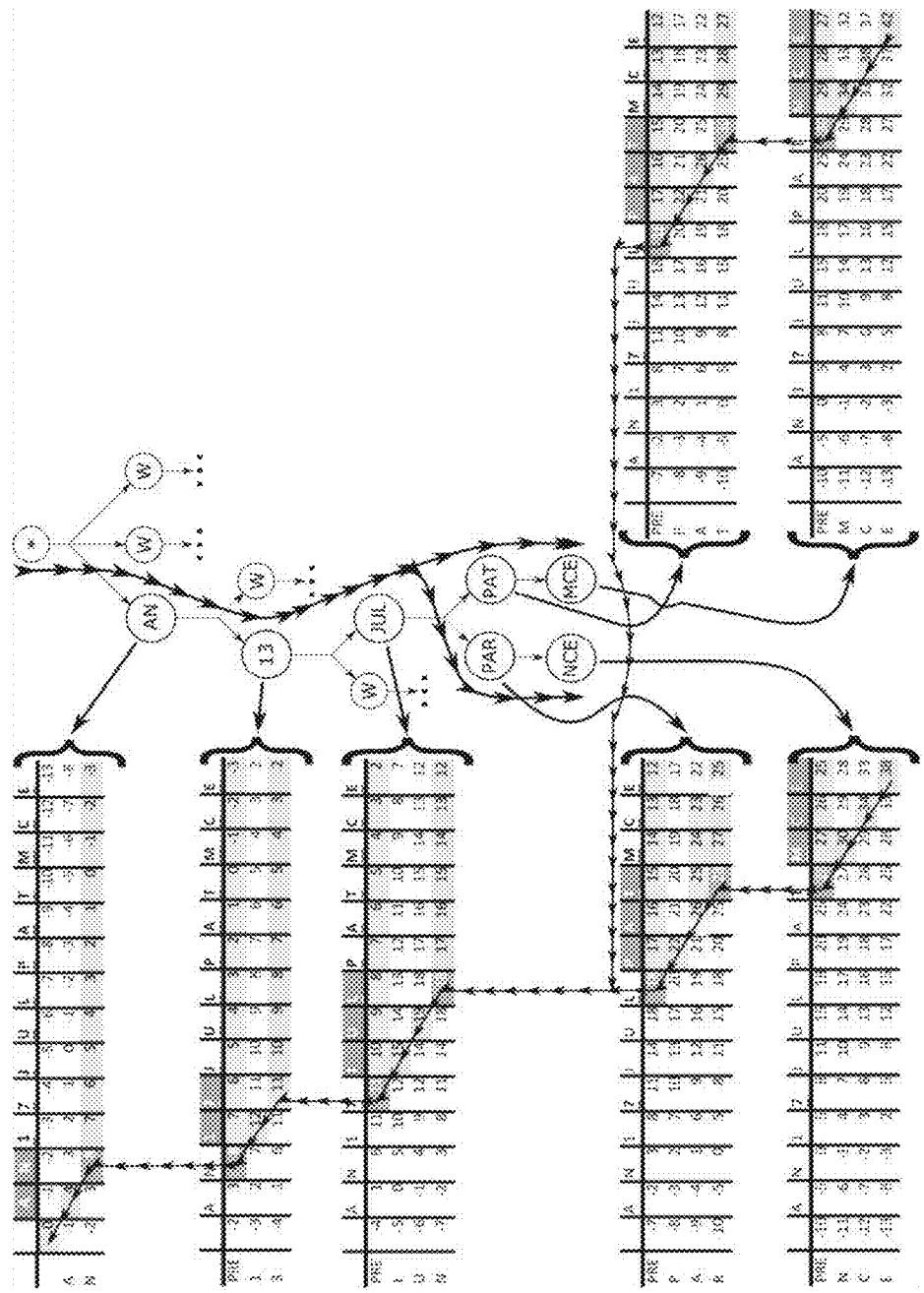
FIGS. 10 and 11 visualize the herein described incremental versions of the Needleman-Wunsch algorithm.

In other embodiments, the Needleman-Wunsch algorithm is performed on the runtime Cryptic command and incrementally on each word in the paths in the stored word-level n-gram tree. An example procedure is depicted in FIG. 10. The runtime Cryptic command is again represented as horizontal string in the score table. A first score table is computed with the first row of the table being initialized as absolute mismatch. At this point, the original Needleman-Wunsch algorithm between the runtime Cryptic command and the first Cryptic word of a path in the word-level n-gram tree, starting from the root, is performed. The resulting score table is temporarily stored. Then, the next word in the path is compared with the runtime Cryptic command. Therefore, an empty score table is created. In contrast to the initialization of the previous score table, the first row is now initialized with values from the last row of the previous score table. The Needleman-Wunsch algorithm is again performed and the resulting score table stored. For the next Cryptic words in the path, this procedure is repeated. All the incremental score tables are put together to obtain one full score matrix.

This incremental approach has several advantages because there are several paths in the word-level n-gram tree that coincide on many nodes. In the example of FIG. 10, the Cryptic command an|17|jul|par|nce has the first three nodes in the word-level n-gram tree in common with an|17|jul|pat|mce. The tree splits after the node jul. Thus, with the incremental procedure of the Needleman-Wunsch algorithm, the comparison with the first three nodes only has to be computed once. This leads to a substantial decrease in computation and memory requirements. Furthermore, an early stopping criterion can further reduce the computational requirements. Very small entries in the score table indicate that there are already very big differences between the runtime Cryptic command and the path in the word-level n-gram tree so far. Thus, a threshold may hinder the method to compute further score tables in this path.

Another incremental approach of the Needleman-Wunsch algorithm is also applied in further embodiments. In the previously described example of an incremental approach, the score table is sliced horizontally according to the words in the word-level n-gram tree. In this example, the score table is sliced vertically according to new inputted Cryptic symbols in the runtime Cryptic command. The logic behind the horizontal and vertical slicing is the same. The only difference comes in the shape of the increments. In the case of the horizontal slicing, the increments are the size of one Cryptic word, while in the case of the vertical slicing the increments are the size of one Cryptic symbol.

Figure 11:
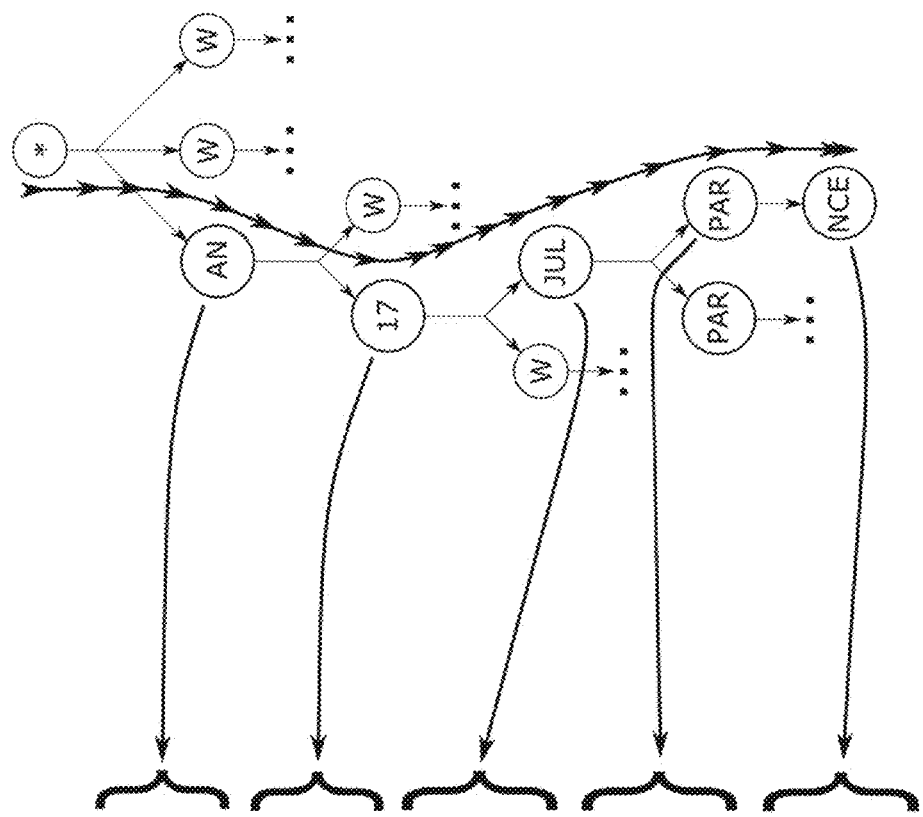
Figure 11:
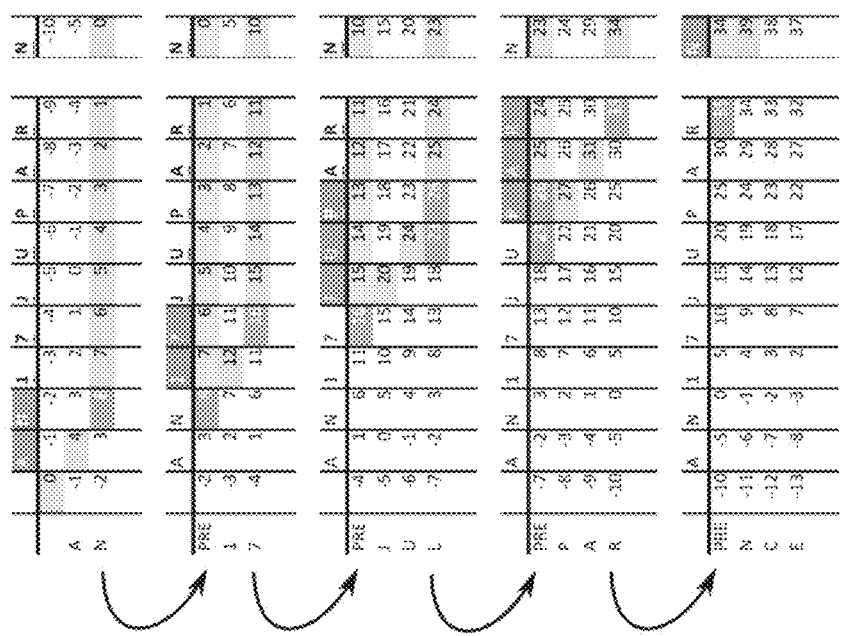

The two incremental versions of the Needleman-Wunsch algorithm may be used separately or may also be combined. The combination of them is shown in FIG. 11. The runtime Cryptic command was an|17|jul|par for the previous execution of the Needleman-Wunsch algorithm. The incremental score tables have been computed therefore and have been stored. The user inputs a next Cryptic symbol, in this example the n. The previously stored score tables receive a new column and only the matching scores for the new Cryptic symbol n must be computed. This again can significantly reduce the computation and memory resources.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow charts, sequence diagrams, and/or block diagrams.

In certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method for auto-completion and auto-correction of Cryptic language with dynamic learning of syntax rules, conducted by a computer system, the Cryptic language containing Cryptic commands, wherein each Cryptic command is composed of unsegmented Cryptic words, wherein each Cryptic word is composed of Cryptic symbols, the method comprising a pair of automatic processes, a general knowledge extraction process and a runtime auto-completion and auto-correction process, wherein the general knowledge extraction process comprises:

receiving, from a database, a training data set containing an temporally ordered collection of Cryptic commands;

segmenting the Cryptic commands into Cryptic symbols;

creating a symbol-level n-gram tree by using the information of the in Cryptic symbols segmented set of Cryptic commands, wherein the symbol-level n-gram tree captures n-gram information between Cryptic symbols;

storing the symbol-level n-gram tree;

determining positions of separators between Cryptic words within the Cryptic commands by applying a hierarchical majority voting by using the information from the symbol-level n-gram tree, the hierarchical majority voting comprises:

grouping at least one text separation procedure in at least one group; determining, by the at least one text separation procedure, positions for Cryptic word separators;

determining, by a first level voting among the text separation procedures within each group, positions for Cryptic word separators; and thereafter determining, by a second level voting among the groups, final positions for Cryptic word separators;

segmenting the Cryptic commands into Cryptic words based on the final positions determined by the hierarchical majority voting;

creating a word-level n-gram tree and a word-bounded symbol-level n-gram tree by using the information of the in Cryptic words segmented Cryptic commands, wherein the word-level n-gram tree captures n-gram information between Cryptic words and the word-bounded symbol-level n-gram tree captures n-gram information between Cryptic symbols within Cryptic words;

storing the word-level and the word-bounded symbol-level n-gram tree;

extracting Cryptic command IDs from the Cryptic commands, wherein a Cryptic command ID is the first Cryptic word at the beginning of a Cryptic command, by using the information of the word-level n-gram tree;

storing a modified training data set containing the temporally ordered Cryptic command IDs;

creating a command-level n-gram tree by using the information of the modified training data set, wherein the command-level n-gram tree captures n-gram information between Cryptic command IDs; and storing the command-level n-gram tree; and the runtime auto-completion and auto-correction process comprises:

receiving, via a user interface, a runtime Cryptic command, wherein the runtime Cryptic command is either empty or composed of at least one Cryptic symbol;

generating auto-correction and auto-completion suggestions for the runtime Cryptic command, wherein the generation of the suggestions is based on the extracted knowledge information about the Cryptic language stored in the symbol-level, word-bounded symbol-level, word-level, and command-level n-gram trees;

returning, via the user interface to the user, the auto-correction and auto-completion suggestions for the runtime Cryptic command; and updating, for the runtime Cryptic command being complete and correct, in the database, the stored training data set of Cryptic commands by adding the runtime Cryptic command.

2. The method of claim 1, wherein the generation of the auto-completion suggestions, in response to the runtime Cryptic command being empty, comprises:

searching for the most likely Cryptic command IDs in the command-level n-gram tree starting from the root; and storing the most likely following Cryptic command IDs in a list of auto-completion suggestions.

3. The method of claim 1, wherein the runtime auto-completion and auto-correction process, in response to the runtime Cryptic command being complete and correct, further comprises:

extracting a runtime Cryptic command ID from the complete runtime Cryptic command, wherein the runtime Cryptic command ID is the first Cryptic word at the beginning of the final runtime Cryptic command, by using the information of the stored word-level n-gram tree;

adding the extracted runtime Cryptic command ID at the end of a runtime command-level list; and storing the updated runtime command-level list.

4. The method of claim 3, wherein the generation of the auto-completion suggestions, in response to the runtime Cryptic command being empty, comprises:

finding the most matching path in the stored command-level n-gram tree with the runtime command-level list; and storing the most likely following Cryptic command IDs in a list of auto-completion suggestions.

5. The method of claim 1, wherein the generation of the auto-completion suggestions, in response to the runtime Cryptic command being composed of at least one Cryptic symbol, comprises:

traversing the word-level n-gram tree starting from the root and proceeding with the following Cryptic words of the runtime Cryptic command until the last matching node; searching for the most likely following Cryptic words of the last node in the word-level n-gram tree;

storing the most likely following Cryptic words in the list of auto-completion suggestions;

determining the suffix, wherein the suffix are the Cryptic symbols at the end of the runtime Cryptic command not matching a node in the word-level n-gram tree;

in response to the suffix not being empty:

traversing the word-bounded symbol-level n-gram tree starting from the root and proceeding with the following Cryptic symbols of the suffix until the last matching node;

traversing the word-bounded symbol-level n-gram tree from there on to all leafs; and storing the most likely resulting paths, corresponding to Cryptic words, in the list of auto-completion suggestions.

6. The method of claim 1, wherein the generation of the auto-correction suggestions, in response to the runtime Cryptic command being composed of at least one Cryptic symbol, comprises:

performing the Needleman-Wunsch algorithm on the runtime Cryptic command and the stored word-level n-gram tree; and storing the Cryptic words or the Cryptic word sequences with the best matching score in a list of auto-correction suggestions.

7. The method of claim 6, wherein the Needleman-Wunsch algorithm is performed on the runtime Cryptic command and incrementally on each word in the paths in the stored word-level n-gram tree, wherein the resulting score tables of previous comparisons are temporarily stored.

8. The method of claim 6, wherein the Needleman-Wunsch algorithm is performed incrementally on each new inputted Cryptic symbol of the runtime Cryptic command and on the stored word-level n-gram tree, wherein the resulting score tables of previous comparisons are temporarily stored.

9. The method of claim 1, wherein at least one text separation procedure of the general knowledge extraction process is a combination of an entropy based segmentation procedure with a weighted moving average procedure, an exponential moving average procedure, or a majority voting procedure.

10. The method of claim 1, wherein at least one text separation procedure of the general knowledge extraction process is a combination of a mutual information based boundary-oriented segmentation procedure with a weighted moving average procedure, an exponential moving average procedure, or a majority voting procedure.

11. The method of claim 1, wherein at least one of the votings in the general knowledge extraction process is an equal voting.

12. The method of claim 1, wherein the Cryptic commands in the trainings data set are sole Cryptic commands of prior user sessions.

13. A computer system for auto-completion and auto-correction of Cryptic language with dynamic learning of syntax rules, the Cryptic language containing Cryptic commands, wherein each Cryptic command is composed of unsegmented Cryptic words, wherein each Cryptic word is composed of Cryptic symbols, the system comprising:
at least one processor; and
a memory coupled to the one or more processors, the memory storing data comprising program code that, when executed by the one or more processors, causes the system to perform a pair of automatic processes, a general knowledge extraction process and a runtime knowledge extraction process, wherein the general knowledge extraction process comprises:
receiving, from a database, a training data set containing a temporally ordered collection of Cryptic commands;
segmenting the Cryptic commands into Cryptic symbols;
creating a symbol-level n-gram tree by using the information of the in Cryptic symbols segmented set of Cryptic commands, wherein the symbol-level n-gram tree captures n-gram information between Cryptic symbols;
storing the symbol-level n-gram tree;
determining positions of separators between Cryptic words within the Cryptic commands by applying a hierarchical majority voting method by using the information from the symbol-level n-gram tree, the hierarchical majority voting method comprises:
grouping at least one text separation procedure in at least one group;
determining, by the at least one text separation procedure, positions for Cryptic word separators;
determining, by a first level voting among the text separation procedures within each group, positions for Cryptic word separators; and thereafter
determining, by a second level voting among the groups, final positions for Cryptic word separators;
segmenting the Cryptic commands into Cryptic words based on the final positions determined by the hierarchical majority voting procedure;
creating a word-level n-gram tree and a word-bounded symbol-level n-gram tree by using the information of the in Cryptic words segmented Cryptic commands, wherein the word-level n-gram tree captures n-gram information between Cryptic words and the word-bounded symbol-level n-gram tree n-gram information between Cryptic symbols in Cryptic words;
storing the word-level and the word-bounded symbol-level n-gram tree;
extracting Cryptic command IDs from the Cryptic commands, wherein a Cryptic command ID is the first Cryptic word at the beginning of a Cryptic command, by using the information of the word-level n-gram tree;
storing a modified training data set containing the temporally ordered Cryptic command IDs;
creating a command-level n-gram tree by using the information of the modified training data set, wherein the command-level n-gram tree captures n-gram information between Cryptic command IDs; and
storing the command-level n-gram tree; and
the runtime auto-completion and auto-correction process comprises:
receiving, via a user interface, a runtime Cryptic command, wherein the runtime Cryptic command is either empty or composed of at least one Cryptic symbol;
generating auto-correction and auto-completion suggestions for the runtime Cryptic command, wherein the generation of the suggestions is based on the extracted knowledge information about the Cryptic language stored in the symbol and word-level n-gram trees;
returning, via the user interface to the user, the auto-correction and auto-completion suggestions for the runtime Cryptic command; and
updating, for the runtime Cryptic command being complete and correct, in the database, the stored training data set of Cryptic commands by adding the final runtime Cryptic command.

14. The computer system of claim 13, wherein the generation of the auto-completion suggestions, in response to the runtime Cryptic command being empty, comprises:
searching for the most likely Cryptic command IDs in the command-level n-gram tree starting from the root; and
storing the most likely following Cryptic command IDs in a list of auto-completion suggestions.

15. The computer system of claim 13, wherein the runtime auto-completion and auto-correction process, in response to the runtime Cryptic command being complete and correct, further comprises:
extracting a runtime Cryptic command ID from the complete runtime Cryptic command, wherein the runtime Cryptic command ID is the first Cryptic word at the beginning of the final runtime Cryptic command, by using the information of the stored word-level n-gram tree;

adding the extracted runtime Cryptic command ID at the end of a runtime command-level list; and storing the updated runtime command-level list.

16. The computer system of claim 13, wherein the generation of the auto-completion suggestions, in response to the runtime Cryptic command being composed of at least one Cryptic symbol, comprises:

traversing the word-level n-gram tree starting from the root and proceeding with the following Cryptic words of the runtime Cryptic command until the last matching node;

searching for the most likely following Cryptic words of the last node in the word-level n-gram tree;

storing the most likely following Cryptic words in the list of auto-completion suggestions;

determining the suffix, wherein the suffix are the Cryptic symbols at the end of the runtime Cryptic command not matching a node in the word-level n-gram tree; in response to the suffix not being empty:

traversing the word-bounded symbol-level n-gram tree starting from the root and proceeding with the following Cryptic symbols of the suffix until the last matching node;

traversing the word-bounded symbol-level n-gram tree from there on to all leafs; and storing the most likely resulting paths, corresponding to Cryptic words, in the list of auto-completion suggestions.

17. The computer system of claim 13, wherein the generation of the auto-correction suggestions, in response to the runtime Cryptic command being composed of at least one Cryptic symbol, comprises:

performing the Needleman-Wunsch algorithm on the runtime Cryptic command and the stored word-level n-gram tree; and storing the Cryptic words or the Cryptic word sequences with the best matching score in a list of auto-correction suggestions.

18. The computer system of claim 13, wherein at least one text separation procedure of the general knowledge extraction process is a combination of an entropy based segmentation procedure with a weighted moving average procedure, an exponential moving average procedure, or a majority voting procedure.

19. The computer system of claim 13, wherein at least one text separation procedure of the general knowledge extraction process is a combination of a mutual information based boundary-oriented segmentation procedure with a weighted moving average procedure, an exponential moving average procedure, or a majority voting procedure.

20. A computer program product comprising:

a non-transitory computer readable medium; and program code stored on the non-transitory computer readable medium, the program code, when executed on a computer system, being arranged to perform a pair of automatic processes, a general knowledge extraction process and a runtime knowledge extraction process, wherein the general knowledge extraction process comprises:

receiving, from a database, a training data set containing a temporally-ordered collection of Cryptic commands;

segmenting the Cryptic commands into Cryptic symbols;

creating a symbol-level n-gram tree by using the information of the in Cryptic symbols segmented set of Cryptic commands, wherein the symbol-level n-gram tree captures n-gram information between Cryptic symbols;

storing the symbol-level n-gram tree;

determining positions of separators between Cryptic words within the Cryptic commands by applying a hierarchical majority voting method by using the information from the symbol-level n-gram tree, the hierarchical majority voting method comprises:

grouping at least one text separation procedure in at least one group;

determining, by the at least one text separation procedure, positions for Cryptic word separators;

determining, by a first level voting among the text separation procedures within each group, positions for Cryptic word separators; and thereafter determining, by a second level voting among the groups, final positions for Cryptic word separators;

segmenting the Cryptic commands into Cryptic words based on the final positions determined by the hierarchical majority voting procedure;

creating a word-level n-gram tree and a word-bounded symbol-level n-gram tree by using the information of the in Cryptic words segmented Cryptic commands, wherein the word-level n-gram tree captures n-gram information between Cryptic words and the word-bounded symbol-level n-gram tree n-gram information between Cryptic symbols in Cryptic words;

storing the word-level and the word-bounded symbol-level n-gram tree;

extracting Cryptic command IDs from the Cryptic commands, wherein a Cryptic command ID is the first Cryptic word at the beginning of a Cryptic command, by using the information of the word-level n-gram tree;

storing a modified training data set containing the temporally ordered Cryptic command IDs;

creating a command-level n-gram tree by using the information of the modified training data set, wherein the command-level n-gram tree captures n-gram information between Cryptic command IDs; and storing the command-level n-gram tree; and the runtime auto-completion and auto-correction process comprises:

receiving, via a user interface, a runtime Cryptic command, wherein the runtime Cryptic command is either empty or composed of at least one Cryptic symbol;

generating auto-correction and auto-completion suggestions for the runtime Cryptic command, wherein the generation of the suggestions is based on the extracted knowledge information about the Cryptic language stored in the symbol and word-level n-gram trees;

returning, via the user interface to the user, the auto-correction and auto-completion suggestions for the runtime Cryptic command; and updating, for the runtime Cryptic command being complete and correct, in the database, the stored training data set of Cryptic commands by adding the final runtime Cryptic command.

* * * * *